(12) United States Patent
Selb et al.

(10) Patent No.: US 6,293,269 B1
(45) Date of Patent: Sep. 25, 2001

(54) GUIDE RAIL FOR EQUIPMENT FOR WORKING ON CONCRETE AND ROCK

(75) Inventors: Michael Selb, Feldkirch; Josef Schittl, Thueringen, both of (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/366,397

(22) Filed: Aug. 3, 1999

(30) Foreign Application Priority Data

Aug. 4, 1998 (DE) .............................................. 198 35 167

(51) Int. Cl.$^7$ ....................................................... B28D 1/00
(52) U.S. Cl. ............................ 125/1; 125/14; 248/295.11
(58) Field of Search .................. 125/1, 35, 14; 269/73; 248/424, 295.11, 298.1

(56) References Cited

U.S. PATENT DOCUMENTS

| | | | |
|---|---|---|---|
| 2,895,281 | * 7/1959 | Young et al. | 56/221 |
| 3,323,507 | * 6/1967 | Schuman | 125/14 |
| 3,378,307 | * 4/1968 | Dempsey et al. | 125/14 |
| 3,722,497 | * 3/1973 | Hiestand et al. | 124/14 |
| 3,763,845 | * 10/1973 | Hiestand et al. | 125/14 |
| 4,054,179 | * 10/1977 | Destree | 173/32 |
| 4,134,459 | * 1/1979 | Hotchen | 173/32 |
| 4,184,719 | * 1/1980 | Ward | 308/3 R |
| 4,836,494 | * 6/1989 | Johnsen | 248/669 |
| 5,078,119 | * 1/1992 | Holmes et al. | 125/13.01 |
| 5,735,500 | * 4/1998 | Borlinghaus et al. | 248/419 |

* cited by examiner

Primary Examiner—Derris H. Banks
Assistant Examiner—Hadi Shakeri
(74) Attorney, Agent, or Firm—Sidley Austin Brown & Wood, LLP

(57) ABSTRACT

A guide rail for an apparatus for processing concrete and rock, especially for concrete saws or for core drilling equipment, including supporting and guiding surfaces extending in the longitudinal direction, for the apparatus housing, and a profile extending parallel to the supporting and guiding surfaces and having contacting edges disposed at regular intervals from one another and extending transversely to the longitudinal direction, for an advancing mechanism provided at the processing apparatus, with the guide rail being formed of a sheet metal profile by bending an elongate, bent part, punched out of sheet metal, with the supporting and guiding surfaces and the profile for the advancing mechanism being integrated as one piece in the sheet metal profile.

6 Claims, 1 Drawing Sheet

GUIDE RAIL FOR EQUIPMENT FOR WORKING ON CONCRETE AND ROCK

FIELD OF INVENTION

The invention relates to a guide rail for an apparatus for processing concrete and rock, especially for concrete saws or for core drilling equipment, with the guide rail having longitudinally extending supporting and guide surfaces for the apparatus housing, and a profile extending parallel to the supporting and guide surfaces and having equidistantly spaced contacting edges extending transverse to longitudinal extent of the guide rail for a feed mechanism provided on the apparatus.

DESCRIPTION OF THE PRIOR ART

Concrete saws and core drilling equipment for processing concrete and rock are well known and, for example, are produced by the assignee herein. The processing equipment includes a carriage with direct driving and adjusting mechanisms for a saw blade or a core bit, accommodated in the equipment housing. The processing equipment usually is driven electrically or hydraulically. The equipment carriage is mounted on a guide rail. The guide rail includes supporting and guiding surfaces for rollers or slides provided on the equipment housing.

During the working of the constructional component, the position of the equipment carriage can be adjusted along the longitudinal extent of the guide rail. For example, for a core drilling apparatus, the distance between the core bit and the constructional component must be variable, in order to be able to produce the intended borehole. For a concrete saw, it must be possible to adjust the depth and, in addition, to move the saw blade also parallel to the constructional component, in order to be able to advance the cut also parallel to the guide rail. In order to ensure that the apparatus carriage can be shifted, the guide rail includes a profile, which usually is formed as a serrated slat. A feed mechanism, provided at the apparatus housing, engages the contacting edges of the serrated slat and ensures the desired adjustability of the position of the feed mechanism in the longitudinal direction of the guide rail. The feed mechanism can also be constructed so that it can be actuated manually, for example, by a gearwheel, which engages the serrated slat, and is driven by a crank handle. This solution usually is used in core drilling equipment. For concrete saws, the position of the saw carriage usually is adjusted automatically. For this purpose, for example, a gearwheel, which can be rotated automatically to the desired extent, protrudes from the side of the equipment housing, which faces the serrated slat. The teeth of the gearwheel and of the serrated slat, mutually engaging one another, ensure the desired adjustability of the position of the saw carriage along the guide rail.

In order to save weight, guide rails usually are formed of aluminum profiles, which are cast, rolled, drawn or produced in a similar manner. Supporting and guiding surfaces are provided at the seating ledges of a steel material, which is screwed onto the aluminum profile. The supporting ledges may be formed, for example, of a corrosion-resistant steel. The bolted connection with the aluminum profile also offers the possibility of changing the steel ledges when necessary. To prevent corrosion, the serrated slat usually is formed of a galvanized steel. The serrations usually are produced by milling. The separate serrated slat can also be bolted to the aluminum profile. The known guide rails are thus formed as composite constructions of aluminum profiles and steel parts. Numerous manufacturing steps are required in order to produce the individual parts. The installation of the rail is very complex and requires a large number of installation steps. The manufacture of these known guide rails is, therefore, very labor intensive, time consuming and expensive. In spite of being formed of an aluminum profile, the guide rail remains relatively heavy because of the steel parts that have been bolted to it. They are therefore usually available only in lengths of about 1 to 2.5 m, specified by the supplier. These lengths are a result of the total weight of the guide rails, which arises from that of the aluminum profiles and that of the installed steel parts. The length of the guide rails is selected so that the resulting rail weight is still tolerable for the user. The individual rail lengths produced by the assignee herein can be assembled to the desired length, as required.

It is, therefore, an object of the present invention to modify a guide rail for concrete saws or core drilling equipment in such a manner, that these disadvantages of the prior art rails are eliminated. A guide rail is to be provided, the manufacture of which is simplified. The number of expensive, preparatory manufacturing and installation steps is to be reduced. The handling of the guide rail is to be simplified for the user, in particular, the weight of the rails is to be reduced. At the same time, the requirement that the length of the rail can be adapted easily to that desired by the user is to be met.

SUMMARY OF THE INVENTION

These and other objects of the present invention, which will become apparent hereinafter, are achieved by providing a guide rail for an apparatus for processing concrete or rock, especially for concrete saws or core drilling equipment, which has supporting and guiding surfaces, which extend in the longitudinal direction, for the apparatus housing. Parallel to the supporting and guiding surfaces, a profile extends with contacting edges for a feed mechanism provided at the processing equipment. The contacting edges are disposed at regular intervals from one another and extend transversely to the longitudinal direction of the rail. The guide rail is formed of a sheet metal profile, obtained by bending an elongate, bent part, punched out of sheet metal. The supporting and guiding surfaces and the profile for the advancing device are formed as one piece with the sheet metal profile.

Due to the one-piece construction of the guide rail as a sheet metal bent part, punched out of sheet metal, the number of processing steps, which are required for the manufacture, are clearly reduced. Sheet metal parts can be produced and worked easily. The preparatory work, such as cutting to size, punching or the like, can be carried out in one step, immediately prior to the bending step for producing the desired sheet metal profile. The guide rail can be produced in a continuous process by conventional sheet metal profiling equipment. With the shaping of the sheet metal profile, the supporting and guiding surfaces and the profile for the advancing mechanism of the equipment carriage are also produced. Expensive installation steps, such as the bolting on of steel strips or stainless steel serrated slats are omitted. The weight of the guide rail no longer represents the primary limiting factor for the length to which the rail is cut, since sheet metal profiles generally are relatively light. The sheet metal profiles can therefore be made available by the manufacturer in relatively large uniform length, which reduces storage costs and simplifies the logistics. In a later step, the guide rails can also be cut very easily by the user himself to a particular required length.

According to one embodiment of the invention, the contacting edges for the advancing mechanism are provided at crossbars, which are disposed at regular intervals from one another on a flat side of the sheet metal profile. Preferably, the crossbars are disposed between the supporting and guiding surfaces. For example, the crossbars can also protrude, be raised from the surface of the guide rail. The crossbars can be produced, for example, by stamping or punching the reverse side of the sheet metal profile.

In an advantageous embodiment of the present invention, the contacting edges are formed by crossbars, which are disposed in perforations of the sheet metal profile, which are provided at regular intervals from one another. Preferably, the perforations are made before the bending step, for example, by the stamping method. The perforations can also be made by milling. Finally, the possibility also exists of cutting the perforations with a laser device. The perforations can also be produced in this manner in a sheet metal profile, that has already been bent.

For the manufacturing process, it proves to be advantageous if the supporting and guiding surfaces are disposed symmetrically to the longitudinal arrangement of the crossbars. The inventive, centrally disposed crossbars, which are engaged by the feed mechanism of the equipment carriage, also facilitate the guidance and prevent tilting of the carriage.

In view of the weight advantage, which can be achieved with a sheet metal profile, and in view of the strength, which the guide rail is required to exhibit, it proves to be advantageous if the sheet metal profile has a wall thickness from about 1 mm to about 4 mm.

Since the sheet metal profile consists of a stainless steel sheet, it is ensured that none of the guide rail will corrode.

For reasons of strength, it proves to be advantageous if the sheet metal profile is closed along its longitudinal sides. For this purpose, the longitudinal edges of the bent part, punched out of sheet metal, are preferably welded together. The welding takes place preferably during or towards the end of the bending step at the sheet metal profiling plant.

For the strength of the guide rail, it also proves to be advantageous if the sheet metal profile has a cavity. The sheet metal profile, which is formed in this manner, has an adequate strength to withstand required loads. The weight saved is a major advantage of the inventive rail over a completely solid construction.

A further particularly advantageous development of the invention consists that, at the side of the sheet metal profile, averted from the supporting surface, longitudinally extending brackets are provided, which are disposed symmetrically to one another. The longitudinal edges of the brackets face one another and are constructed for attaching fastening elements with which, for example, the rail is fixed to the constructional component.

BRIEF DESCRIPTION OF THE DRAWINGS

Below, the invention will be described in greater detail with reference to an embodiment example shown in the accompanying drawings, wherein.

DETAILED DESCRIPTION OF THE PREFERRED EMBODIMENT

Figure 1:
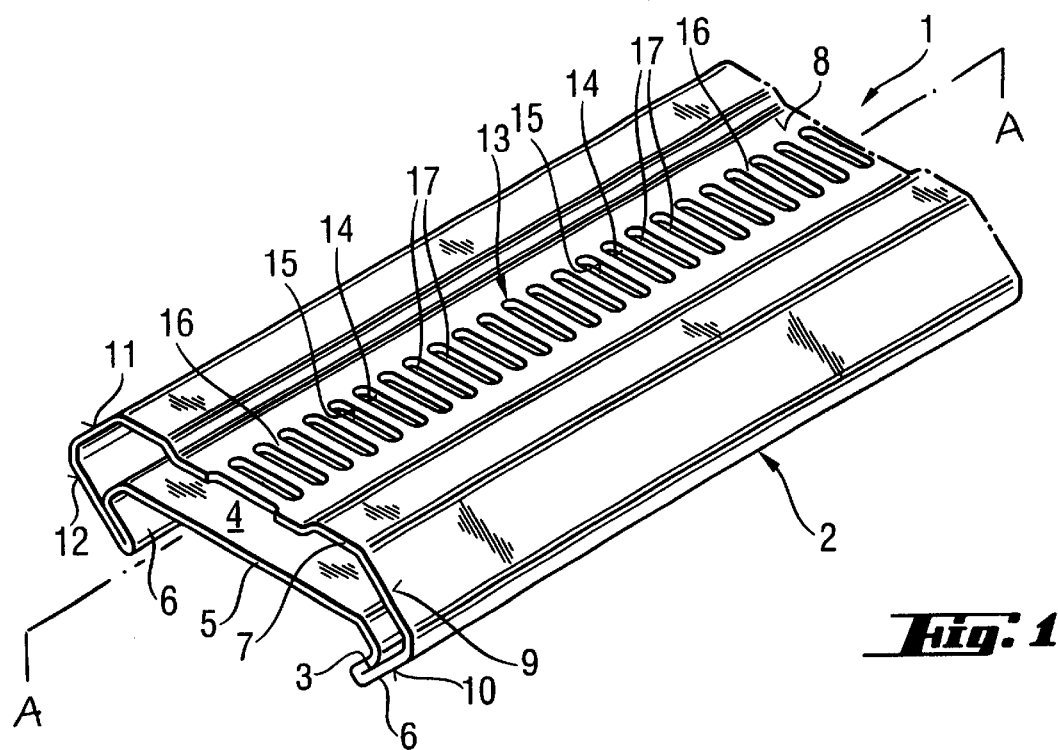
FIG. 1 shows a perspective view of the guide rail according to the present invention.
Figure 2:
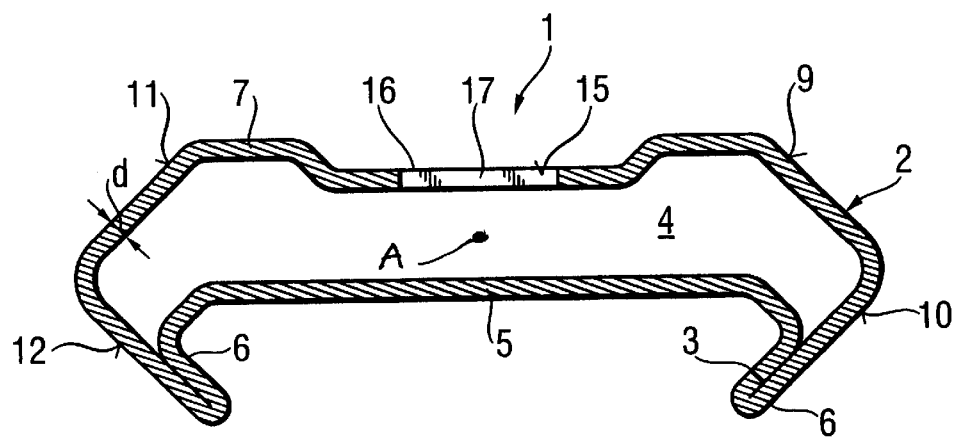
FIG. 2 shows a cross section of the guide rail shown in FIG. 1.

The inventive guide rail, which is shown in FIGS. 1 and 2, is generally labeled with a reference numeral 1. The guide rail 1 consists of an elongated bent part punched out of sheet metal, preferably out of sheet steel, which is bent in sheet metal profiling equipment by a known procedure into a one-piece section of a longitudinally extending sheet metal profile. The sheet metal profile 2 has a longitudinal axis A. The wall thickness d of the sheet metal profile 2 is preferably from about 1 to about 4 mm. The sheet metal profile 2 has a back or lower side or part 15 and an upper side or part 7 both extending longitudinally, which are integrally connected with one another and are welded, e.g., at their longitudinal edges, as is indicated in FIGS. 1 and 2 by reference numeral 3. The sheet metal profile 2, formed in this manner, is a hollow profile with a sickle-shaped cavity 4. The longitudinal sides of the joined back side 5 and the upper side 7 are formed as brackets 6 and have longitudinal edges bent inwardly and facing one another. In an overlapping region of the back side 5 and the upper side 7 along the longitudinal edges, the brackets have twice the wall thickness d of the sheet metal profile 2. The brackets 6 serve for attachment of fastening clamps or similar fastening elements, with which the guide rails 1 can be fixed.

The longitudinal sides of the upper part 7 are bent in such a manner, that they form supporting and guiding surfaces 9, 10 or 11, 12, which in each case form an acute angle with one another and serve to support and guide the carriage of the processing equipment (not shown). The central section of the upper part 7, which lies between the supporting and guiding surfaces 9, 11, is formed as a flat upper side 8. The flat upper side 8 of the guide rail 1 has an indented profile 13 for a feed mechanism of the processing apparatus (not shown). For this purpose, perforations 17, which extend mainly transversely to the longitudinal extent of the guide rail 1, are produced in this embodiment. The perforations 17 are disposed at uniform intervals from one another in the longitudinal direction of the guide rail. Crossbars 16 remain between the perforations 17. The two edges of each crossbar 16 form contact edges 14 or 15 for the advancing mechanism of the processing equipment, for example, for the teeth of a toothed wheel, protruding out of the equipment housing. The perforations 17 may be punched, milled or also cut, for example, with a laser device. The crossbars 16, which remain between the perforations 17, fulfill the same function as the teeth of a serrated slat which is separately bolted on in the case of the conventional guide rails. In another embodiment of the invention, the crossbars can also be formed by rib-like profiles which protrude from the flat upper side. In this embodiment of the guide rail, the perforations can be omitted. The rib-like profiles can be formed, for example, by stamping the upper side from its back or lower side.

The inventive guide rail can be manufactured easily and relatively inexpensively. Since the sheet metal profile consists of stainless steel, corrosion resistance of the entire guide rail is insured. Sheet metal profiles distinguish by their relatively low weight and nevertheless, because of their shape, have the required strength. The guide rail can be produced by a continuous manufacturing process. The length achieved can be optimized with respect to simplifying storage and handling. The guide rails, formed as sheet metal profiles, can be cut to length relatively easily as required. Essentially, only tin snips are required for this purpose. As a result, the user also has the possibility of cutting the guide rail to the desired length on site.

What is claimed is:

1. A guide rail for a processing apparatus used when working on concrete and rock, said guide rail having a longitudinal axis (A) and bent from a one-piece section of sheet metal formed of stainless steel, said guide rail having an upper part (7) and a lower part (5) spaced from said upper part (7) and each extending in the direction of the longitudinal axis (A) and having longitudinally extending edges on opposites sides of said longitudinal axis, symmetrical longitudinally extending sides (9, 10; 11, 12) extending between said upper and lower parts, said sides (9, 10; 11, 12) forming longitudinally extending supporting and guiding surfaces (9, 10; 11, 12) with each said sides comprising a first side surface (9; 11) extending laterally outwardly from each of said, longitudinally extending edges of said upper part and a second side surface (10; 12) extending laterally outwardly from each of said, longitudinally extending edges of said lower part, so that said first and second side surfaces are angularly disposed to one another and meet at a line laterally outwardly from and intermediate said upper and lower parts, said upper part having a planar profiled surface (13) indented toward and spaced from said lower part (5) and extending in the direction of the longitudinal axis (A) for the full longitudinal length thereof and comprising perforations (17) therethrough spaced uniformly apart in and extending transversely in the direction of the longitudinal axis (A) with cross bars (16) located between said perforations (17), said cross bars (16) arranged to form contacting edges for positioning a feed mechanism forming a part of the processing apparatus.

2. The guide rail of claim 1, wherein said one-piece section of sheet metal has a wall thickness (d) from about 1 mm to about 4 mm.

3. The guide rail of claim 1, wherein said guide rail is closed along its longitudinal sides (9, 10, 11, 12).

4. The guide rail of claim 3, wherein said guide rail is closed by welding longitudinally extending planar surfaces of second side surfaces (10, 12) of said one-piece section of sheet metal.

5. The guide rail of claim 4, wherein the bent one-piece section of sheet metal forms an enclosed cavity (4).

6. The guide rail of claim 4, wherein at least part of said second side surfaces (10, 12) are doubled over and form brackets (6) which extend symmetrically to one another in the direction of the longitudinal axis of the guide rail, and longitudinal edges of the doubled over second side surfaces face one another and enable attachment of fastening elements for fixing the guide rail (1) to a constructional component.

* * * * *